Figure 1:
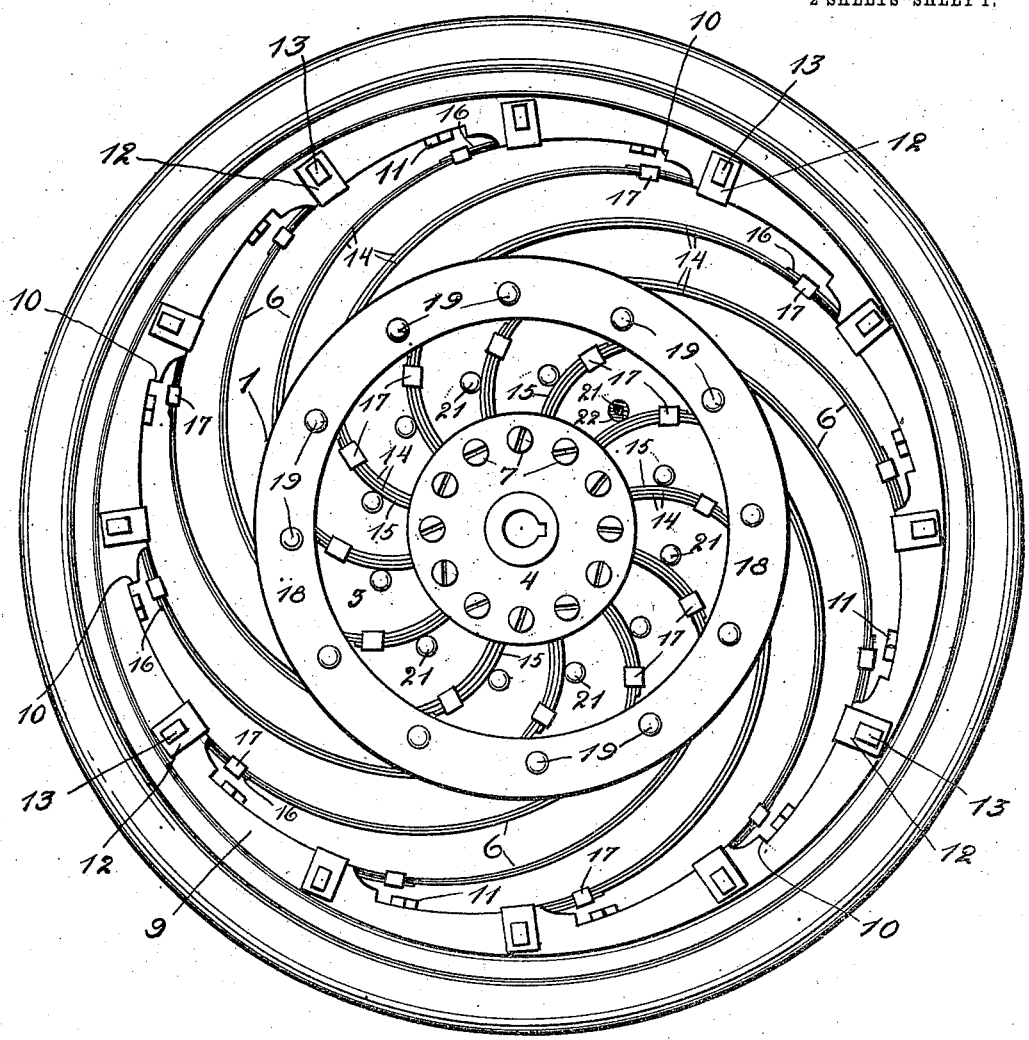

J. B. HAYDEN.
VEHICLE WHEEL.
APPLICATION FILED MAR. 1, 1911.

1,043,828.

Patented Nov. 12, 1912.
2 SHEETS—SHEET 1.

Witnesses

Inventor
Jefferson B. Hayden
By
D. A. Gourick, Attorney

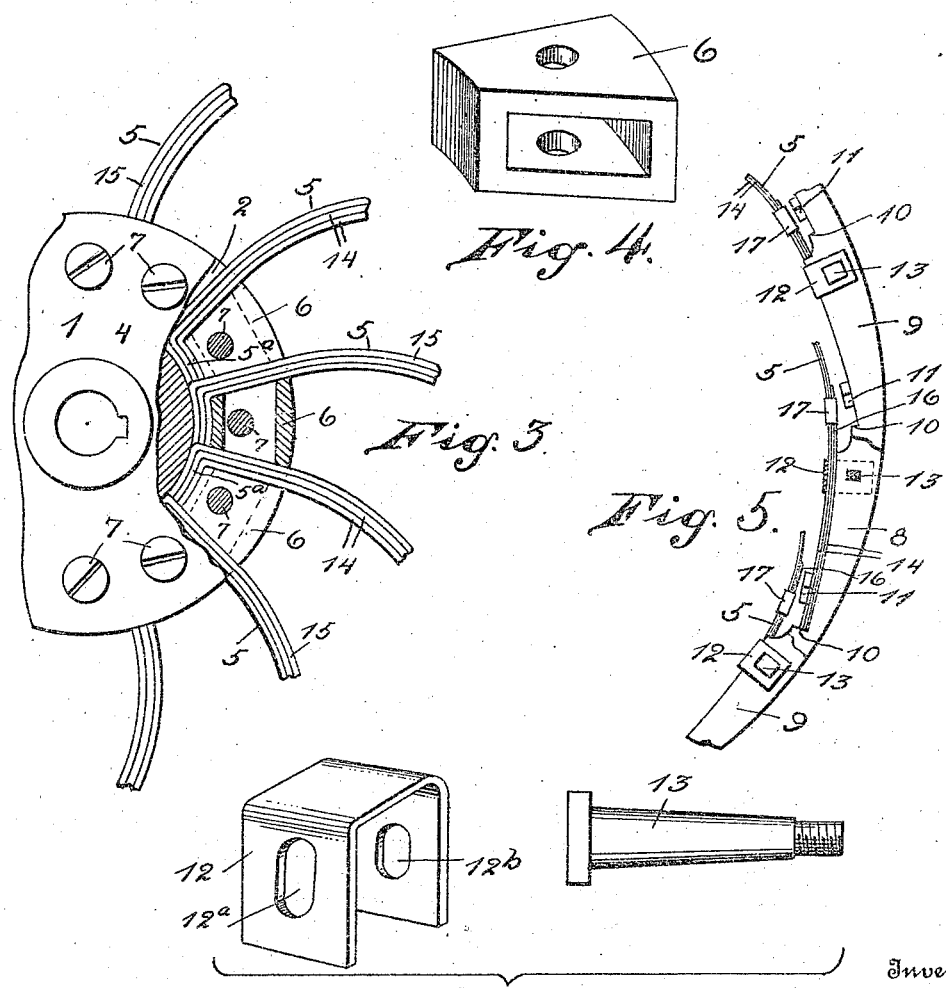

UNITED STATES PATENT OFFICE.

JEFFERSON B. HAYDEN, OF SAN ANGELO, TEXAS.

VEHICLE-WHEEL.

1,043,828.
Specification of Letters Patent.
Patented Nov. 12, 1912.

Application filed March 1, 1911. Serial No. 611,590.

*To all whom it may concern:*

Be it known that I, JEFFERSON B. HAYDEN, a citizen of the United States, residing at San Angelo, in the county of Tom Green and State of Texas, have invented certain new and useful Improvements in Vehicle-Wheels, of which the following is a specification.

My invention relates to wheels for use on motor vehicles, traction engines, carriages and wagons and has for its object the provision of a wheel made with spring spokes so constructed and secured in position that the vehicle may be used on the roughest of roads and subjected to the hardest kind of usage and the vehicle run in a backward as well as a forward direction without danger of breaking the spokes.

Heretofore, in wheels employing spring leaf spokes, the spokes have been either too nearly straight so that when subjected to a sudden strain the spokes are broken at the hub, or the curve has been too pronounced so that they break intermediate of their ends.

The spokes used in my improved wheel are the result of a long series of experiments and consist of two or more layers of thin spring steel secured to the hub and rim on radial lines from ninety to one hundred and twenty degrees removed, the springs describing curved lines with radii of constantly increasing length. By using two or more layers of thin spring steel I secure a stronger spring than where springs are used made of a single piece of steel of the combined thickness of the layers, because the thin strips of metal are evenly tempered throughout while the thicker strips are liable to have soft or frangible cores that break when subjected to strains.

My invention also has for its object the provision of means to relieve the springs where secured to the hub of the effect of the side thrust of the vehicle in rounding curves or while traveling on roads that are higher on one side than the other, consisting of an extension of the hub on one side of the wheel to form a brace that engages the edges of the springs, and securing a ring on the other side of the spring by means of bolts engaging the plate and ring. Said bolts are passed between the spokes adjacent to their outer curve and are provided with sleeves of cushion material that act as bumpers to limit the movement of the springs.

My invention also consists in improved means for securing the springs to the hub and rim which will be described in detail hereinafter and illustrated in the accompanying drawings in which:—

Figure 1 is a side view of my improved wheel, Fig. 2, a cross section through the center of the wheel, Fig. 3, sectional detail of the hub fastening means, Fig. 4, a detail view of one of the blocks used in the hub, Fig. 5, a sectional detail of the rim, and Fig. 6, a detail view of one of the clips and bolts used to secure the spring to the rim.

In the drawings similar reference characters indicate corresponding parts in the several views.

The hub 1 of my improved wheel is formed with an annular channel 2 inclosed by side plates 3 and 4, the plate 3 being of greater diameter than plate 4 for the purpose hereinafter stated. Channel 2 is provided to receive the inner ends of spokes 5 that are secured in position by means of blocks 6 made preferably of aluminum to secure strength without adding unduly to the weight of the hub section. In the drawings the spokes 5 are shown formed with angular ends 5ᵃ that engage the inner edges of the blocks but I do not limit myself to this structure as any other structure of the spoke may be substituted without altering the spirit of my invention. Blocks 6 are held in channel 2 and in engagement with the spokes by means of bolts 7 engaging plates 3 and 4 and the blocks. The rim 8 is also formed of aluminum with steel plates 9 on each side thereof, the inner surface of the rim being formed with a series of notches 10 to receive the ends of the spokes 5, said spokes being secured to the rim at their ends by means of bolts 11 and by means of U-shaped clips 12 at the outer ends of the notches, said clips being secured to the rim by means of wedge-shaped bolts 13, the holes 12ᵃ and 12ᵇ in the clips being so arranged that when the bolts 13 are placed in position the wedge portion pulls evenly on the two sides of the clip to clamp the spoke in position. The edges of the plates 9 opposite the notches 10 in the aluminum rim extend beyond the surface of the notches the thickness of the spring spokes 5 to form abutments to prevent lateral displacement of the ends of the spokes when in position.

Spokes 5 are each formed of a plurality of strips of spring steel designated 14 and are shaped in curves describing spiral lines having ever increasing radii from the hub 1 to the rim 8. By experimentation I have discovered that where the ends of the spokes are secured to the hub and rim on radii of the wheel that are between ninety and one hundred and twenty degrees removed from one another that the springs will stand the shocks and jars to which a vehicle will be reasonably subjected during ordinary usage, and furthermore the wheels may be rotated in a reverse direction without twisting or breaking the spokes; but that if the ends of the spokes are secured on radii that are less than ninety degrees removed or more than one hundred and twenty they will break when subjected to strain. I also provide strengthening strips 15 at the hub end of the spoke, and 16 at the rim end, that are secured in position with the ends of the spokes and have their loose ends secured to the spokes by means of band 17 wrapped around the spokes and strips.

18 indicates a ring secured on the opposite side of the spokes 5 from the plate 3 by means of bolts 19 engaging the plate and ring, one each of the bolts 19 being secured approximately an inch distant from the convex side of the springs and are covered with sleeves 20 of cushion material, said covered bolts forming buffers to limit the movement of the hub in relation to the rim. It will also be apparent that the plate 3 being integral with the hub and the ring 18 secured thereto acts as a brace to limit the side thrust of the hub relative to the rim in turning the vehicle and in traveling over roads that are higher on one side of the vehicle than on the other.

21 indicates bolts covered with cushion sleeves 22 secured to plate 3, adjacent to the hub 1, and engaging the spokes 5 to strengthen them.

Having thus described my invention what I claim is:—

1. In a wheel, a hub having two plates spaced apart to form a channel, one of said plates being of greater diameter than the other, a rim, spring spokes secured in said hub channel and to the rim and engaging the hub plate aforesaid, and a ring secured to the plate and engaging the opposite edges of the spokes.

2. In a wheel, a hub having two plates spaced apart to form a channel, one of said plates being of greater diameter than the other, a rim, spring spokes secured in said hub channel and to the rim and engaging the hub plate aforesaid, a ring engaging the opposite edges of the spokes, and bolts connecting said plate and ring and positioned to limit the movement of the hub relative to the rim.

3. In a spring wheel, a rim consisting of a ring having a series of notches, and side plates notched to conform to the notches in the rim but projecting beyond the surfaces of the notches to form flanges, spring spokes, and means to secure the ends of the spokes in the notches in the rim.

4. In a spring wheel, a rim, spring spokes engaging the rim, U-shaped clips engaging the spokes and rim, and wedge bolts engaging the rim and clips, the rim and clips formed with corresponding wedge-shaped openings to receive the wedge bolts.

5. In a wheel, a hub comprising two plates spaced apart to form a channel, one of said plates being of greater diameter than the other, a rim, spring spokes, said spokes being secured at one extremity to the rim and having a right angle portion on their opposite extremity, said right angle portion adapted to be received in the hub channel, fastening means for said spokes, and a ring secured to the hub plate of largest diameter near its periphery, fastening means for said ring, said fastening means serving to limit the relative movement of the hub and rim.

6. In a wheel, a hub comprising two plates spaced apart to form a channel, one of said plates being of greater diameter than the other, a rim, spring spokes secured to the hub and rim at opposite extremities, a ring of a diameter equal to that of the largest hub plate, and means for securing the ring to said hub plate, said means comprising a plurality of bolts passing through said hub plate and said ring, and so positioned as to engage the spring spokes to limit the relative movement of the rim and hub.

In testimony whereof I hereto affix my signature in the presence of two witnesses.

JEFFERSON B. HAYDEN.

Witnesses:
L. F. RANDOLPH, Jr.,
Jos. R. EVANS.

Copies of this patent may be obtained for five cents each, by addressing the "Commissioner of Patents, Washington, D. C."